DIGITAL FUNCTION SYNTHESIZER

Filed Dec. 30, 1966 4 Sheets-Sheet 1

INVENTORS.
STEPHEN N. ANDRE,
WILLIAM E. DeLISLE and
RONALD D. HETTICH

BY [signature]
ATTORNEY.

DIGITAL FUNCTION SYNTHESIZER

Filed Dec. 30, 1966 4 Sheets-Sheet 2

INVENTORS.
STEPHEN N. ANDRE,
WILLIAM E. DeLISLE and
RONALD D. HETTICH

BY Stanley M. Schurgin
ATTORNEY.

INVENTORS.
STEPHEN N. ANDRE,
WILLIAM E. DeLISLE and
RONALD D. HETTICH

BY Stanley M. Schurgin
ATTORNEY.

1

3,529,138
DIGITAL FUNCTION SYNTHESIZER
Stephen N. Andre, Tonawanda, William E. De Lisle, Buffalo, and Ronald D. Hettich, Depew, N.Y., assignors to Sylvania Electric Products Inc., a corporation of Delaware
Filed Dec. 30, 1966, Ser. No. 606,136
Int. Cl. G06f *15/34;* G06j *1/00*
U.S. Cl. 235—150.53 8 Claims

ABSTRACT OF THE DISCLOSURE

A function synthesizer comprising a rate generator for producing a plurality of interleaved pulse trains in response to applied input pulses, and a set of logic gates for combining the interleaved pulse trains to form desired composite rate pulse trains. A second set of logic gates are programmer controlled to select the generated composite pulse trains one at a time according to a pre-established sequence and apply the selected pulse trains through a digital smoothing filter to drive a binary counter. A digital to analog converter is connected to the parallel outputs of the counter for generating the output function values.

This in vention relates generally to function synthesizers and, more particularly, to a digital function synthesizer capable of very low speed operation and adaptable to a wide range of rate variation.

One application toward which the present invention is particularly directed is to provide a low speed waveform synthesizer for a communication system terminal mounted on a space vehicle. Such an application requires a device having a low power consumption and high accuracy for long unattended periods. Prior methods for synthesizing very low speed waveforms employed mechanical devices or analog computer techniques and did not have the requisite reliability and long term stability.

With an awareness of the limitations and disadvantages of the prior art, applicants have as a general object of the present invention to provide improved means for synthesizing functions.

A principle object of the invention is to provide a digital function synthesizer capable of very low speed operation and adaptable to a wide range of rate variation.

A further object of the invention is to provide a function synthesizer having relatively low power consumption and capable of high accuracy operation for long unattended periods.

Briefly, the present invention accomplishes the above objects by an all digital circuit arrangement comprising: means responsive to applied input pulses for generating a set of pulse trains, each having a selected rate with respect to the input; a binary counter; a set of programmed gates for selecting the generated pulse trains one at a time according to a pre-established sequence to drive the counter; and, a digital to analog converter connected at the output of the counter for generating a voltage of amplitude corresponding to the binary number in the counter, this output voltage level being the programmed function value corresponding to a given synthesizer input pulse number. The rate of change of the digital to analog converter output voltage, with respect to the number of input pulses applied to the synthesizer, corresponds to the rate at which

2 drive pulses are applied to the counter, and the direction of the output voltage change corresponds to the direction of count. Consequently, the slope of the sequence of generated function values is determined by the counter drive rate, and the sense of the slope corresponds to the direction of count. Each of the above-mentioned pulse trains, therefore, is operative to generate a linear function segment of a slope corresponding to the rate of the pulse train. Hence, by driving the counter with a programmed sequence of pulse trains of different rates, an approximation to a desired function may be synthesized in the form of a sequence of linear segments of appropriate slope.

The synthesizer is quite versatile in that the function generated is strictly a function of the number of input pulses applied and, hence, is not restricted to a domain of time. Consequently, although the device is well suited to the synthesis of time-dependent waveform functions, as will be described, it is equally suitable for application as a function-value "look-up" table.

Other objects, features and advantages of the invention will become apparent and its construction and operation better understood from the following detailed description, taken in conjunction with the accompanying drawings, in which:

FIG. 1 is a simplified block diagram of a digital function synthesizer according to the invention;

FIGS. 2*a*, 2*b*, and 2*c* are timing diagrams illustrating waveforms at various points in the synthesizer circuit of FIG. 1;

Figure 1:
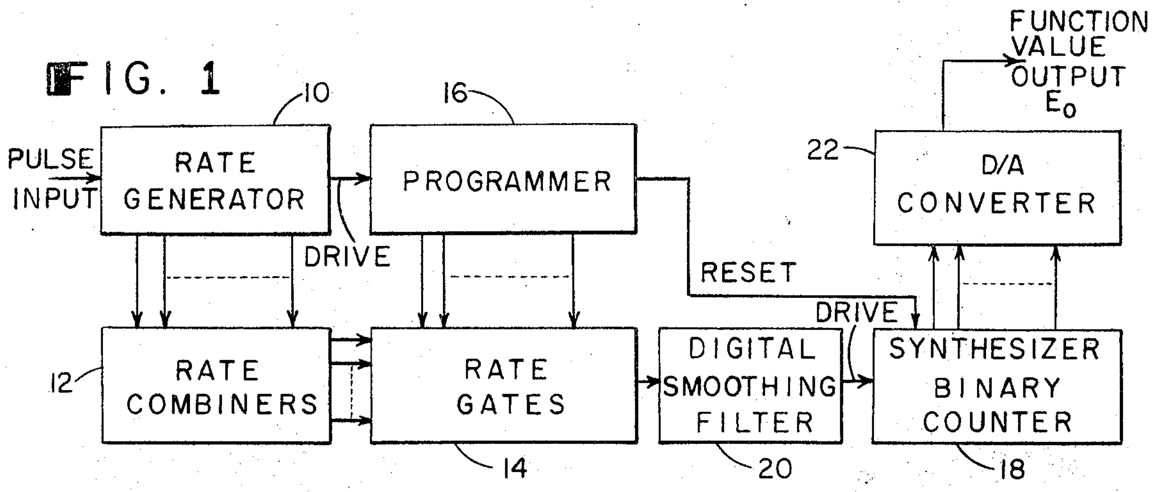

Referring now to FIG. 1, the basic elements of a preferred embodiment of the present invention comprise: a rate generator 10 for producing a plurality of interleaved pulse trains in response to applied input pulses; a plurality of rate combiners 12 for combining the interleaved pulse trains to form desired composite rate pulse trains; a plurality of rate gates 14 controlled by a programmer 16 to select the composite pulse trains generated from the rate combiners one at a time according to a pre-established sequence; a synthesizer binary counter 18 having a pulse drive input which is coupled to the output of the set of rate gates 14 through a digital smoothing filter 20; and, a digital to analog converter 22 connected to the output of counter 18 for generating the output function values. The structural details of the illustrated circuit blocks are described hereinafter by reference to circuit components and logic functions having implementations which are well known in various modifications of those skilled in the art of digital communications and data processing. Consequently, there is no need for burdening the present description with detailed logic diagrams and a recitation of their construction and operation.

Figure 2A:
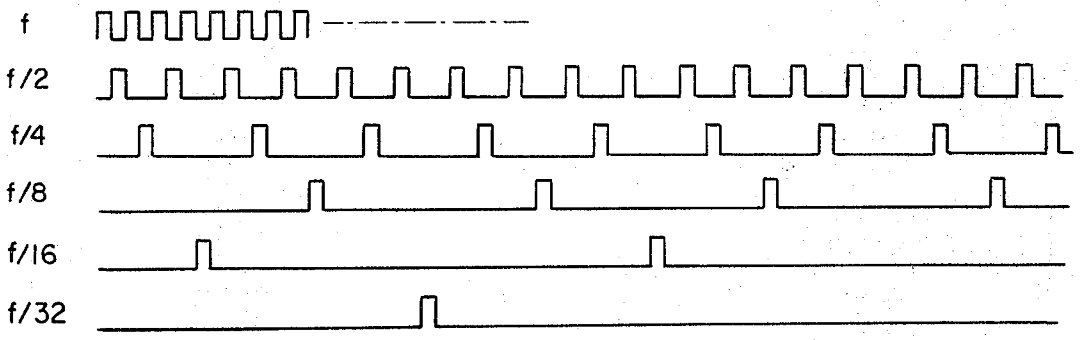

For the moment, it will be assumed that the input to the synthesizer comprises a series of pulses from a given source at a constant rate $f$. In order to produce the desired interleaved pulse trains, the rate generator 10 may comprise a string of binary divider stages connected to form a ripple counter and a logic circuit coupled to the outputs of the divider stages for generating, in response to the input pulses, a plurality of interleaved pulse trains having respective rates of $f/2$, $f/4$, $f/8 \ldots f/2^n$, where $n$ is the number of divider stages forming the ripple counter. FIG. 2*a* shows the waveforms of interleaved pulse trains $f/2$ through $f/32$ referenced to the input pulse train $f$.

The rate combiners 12 may consist of a set of NOR gates which collect selected output pulse trains from the rate generator and combine them to form composite pulse trains having the precise rates required for generation of the different slopes of the desired function. The resolution to which these slopes may be specified is determined by the number of stages in the rate generator divider; e.g., with $n$ stages, all rates of the form $$a_1f/2+a_2f/4+a_3f/8+ \ldots +a_nf/2^n$$

where $a_k=0$ or 1, are available. For example, referring to FIG. 2*b*, the composite rate $$60f/128=(0)f/2+(1)f/4+(1)f/8 +(1)f/16+(1)f/32+(0)(f/64+ \ldots +f/2^n)$$

Figure 2B:
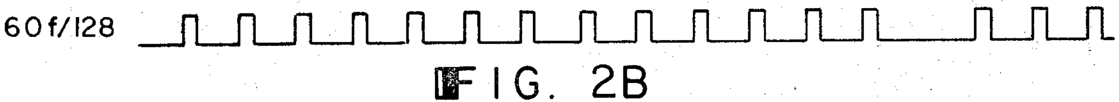

The waveforms in FIGS. 2*a* and 2*b* clearly illustrate that the pulse trains applied to the rate combiners 10 must be interleaved so that any or all of them can be combined without any overlapping pulses.

Figure 2C:
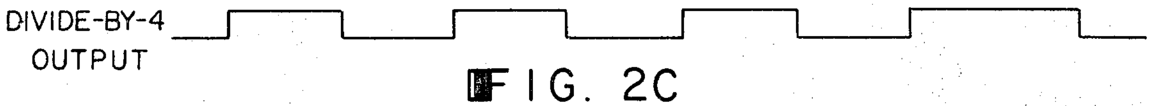

The programmer 16 may comprise a counter driven by one of the rate generator outputs and appropriate logic circuitry. The counter is used to control the states of the programmer, the different states of a program cycle being equal in number to the linear segments required to approximate the desired function, and the logic circuitry reads and decodes the contents of the counter to provide the desired control signals in a programmed manner in response to a sequence of programmer states. The rate gates 14 may comprise a set of NAND gates, each having an input connected to one of the rate combiner outputs, and a single NOR gate to which all of the NAND gates are connected to provide a single output. During each state of the programmer, the rate gates are signalled to allow a selected one of the composite pulse trains to be applied via digital smoothing filter 20 to drive the synthesizer binary counter 18. The smoothing filter, which may comprise a binary divider, is used due to the irregularity of the composite pulse trains, as illustrated in FIG. 2*b*. FIG. 2*c* illustrates the effects of a divide-by-four circuit on the $60f/128$ pulse train.

Figure 3:
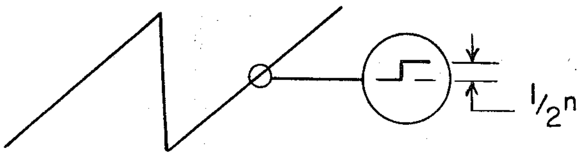
FIG. 3 shows the output waveform for one mode of operation of the synthesizer of FIG. 1.

Each count of the synthesizer binary counter 18 is read-out as a corresponding voltage level, $E_0$, by means of the digital to analog converter 22. Counter 18 is maintained in phase synchronism by periodic application of a reset pulse from the programmer. If counter 18 is continuously driven by a fixed rate pulse train, the digital to analog converter produces a sawtooth waveform as shown in FIG. 3. Each sawtooth cycle comprises $2^n$ voltage level steps, where $n$ is the number of synthesizer counter stages, and the slope of the sawtooth corresponds to the counter drive rate. The maximum amplitude represents the all one's count and the minimum level represents the zero count.

Since the synthesizer is capable of providing a variable drive rate to binary counter 18, i.e. a programmed sequence of different rate pulse trains, it can be adapted to generate any desired waveform. Furthermore, if counter 18 is of the UP/DOWN type, i.e. adapted to count up or down in response to a direction control signal applied thereto, negative slopes may also be generated, with the programmer controlling the direction of count. Thus, a monotonically increasing function can be generated by use of an up count, and a monotonically decreasing function can be generated by a down count. Any symmetries in the waveform tend to simplify the required program, as will be illustrated hereinafter.

It will be observed that with a fixed rate input to the rate generator, the device operates as a waveform synthesizer generating a function of time. In essence, however, the series of applied input pulses represents the domain of the function, and the generated sequence of output voltage values, $E_0$, represents the range of the function. Thus, $E_0=f(x)$, where $x$=the number of input pulses from some reference point. Consequently, the input need not be a fixed rate, and the function may be generated as a function of $x$, the number of input pulses applied, rather than a function of time. These features make the synthesizer quite useful for applications having extremely low input rates, or even random occurrence of input pulses.

Figure 4:
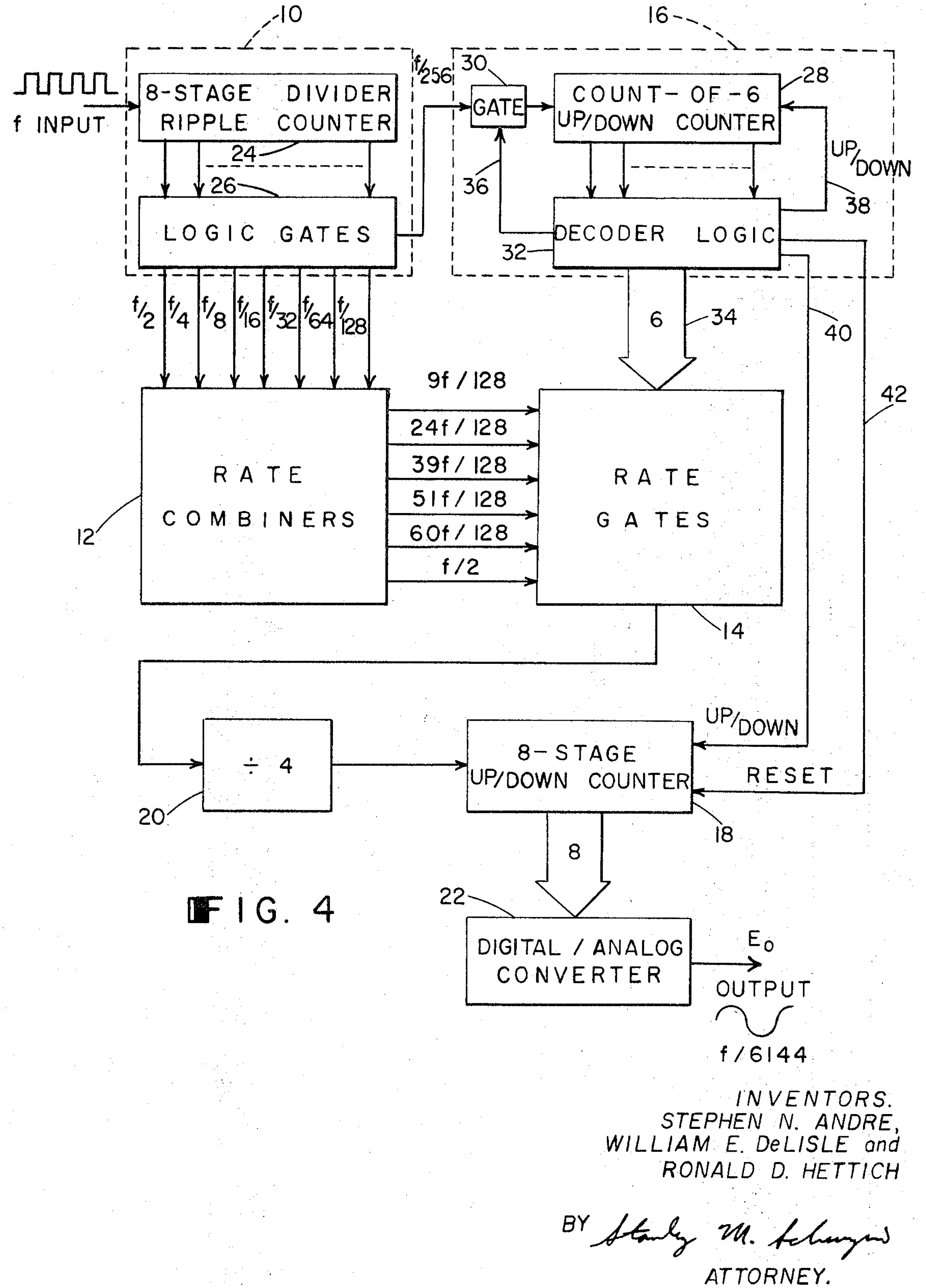
FIG. 4 is a block diagram of one embodiment of the synthesizer in accordance with the present invention for generating a sine wave function.

The block diagram of FIG. 4 illustrates a specific embodiment of the invention designed to generate a sinusoidal function. In this instance, the initial pulse rates required from rate generator 10 are $f/2$, $f/4$, $f/8$, $f/16$, $f/32$, $f/64$, $f/128$ and $f/256$, where $f$ is the constant input pulse rate. Consequently, the rate generator comprises a divider (ripple counter) 24 consisting of eight flip-flop stages and a set of logic gates 26 connected to the outputs of the flip-flop stages to produce the desired pulse trains. More specifically, interleaved pulse trains having the denoted respective rates of $f/2$ through $f/256$ are obtained by connecting the output logic according to the following equations, in which FF1 and $\overline{\text{FF1}}$ denote the output of flip-flop stage 1 and its complement, respectively, FF2 and $\overline{\text{FF2}}$ denote the outputs of flip-flop stage 2, and so on:

$$f/2=f\cdot \text{FF1}$$
$$f/4=f\cdot \overline{\text{FF1}}\cdot \text{FF2}$$
$$f/8=f\cdot \overline{\text{FF1}}\cdot \overline{\text{FF2}}\cdot \text{FF3}$$
$$f/16=f\cdot \overline{\text{FF1}}\cdot \overline{\text{FF2}}\cdot \overline{\text{FF3}}\cdot \text{FF4}$$
$$f/32=f\cdot \overline{\text{FF1}}\cdot \overline{\text{FF2}}\cdot \overline{\text{FF3}}\cdot \overline{\text{FF4}}\cdot \text{FF5}$$
$$f64=f\cdot \overline{\text{FF1}}\cdot \overline{\text{FF2}}\cdot \overline{\text{FF3}}\cdot \overline{\text{FF4}}\cdot \overline{\text{FF5}}\cdot \text{FF6}$$
$$f/128=f\cdot \overline{\text{FF1}}\cdot \overline{\text{FF2}}\cdot \overline{\text{FF3}}\cdot \overline{\text{FF4}}\cdot \overline{\text{FF5}}\cdot \overline{\text{FF6}}\cdot \text{FF7}$$
$$f/256=f\cdot \overline{\text{FF1}}\cdot \overline{\text{FF2}}\cdot \overline{\text{FF3}}\cdot \overline{\text{FF4}}\cdot \overline{\text{FF5}}\cdot \overline{\text{FF6}}\cdot \overline{\text{FF7}}\cdot \text{FF8}$$

Figure 6:
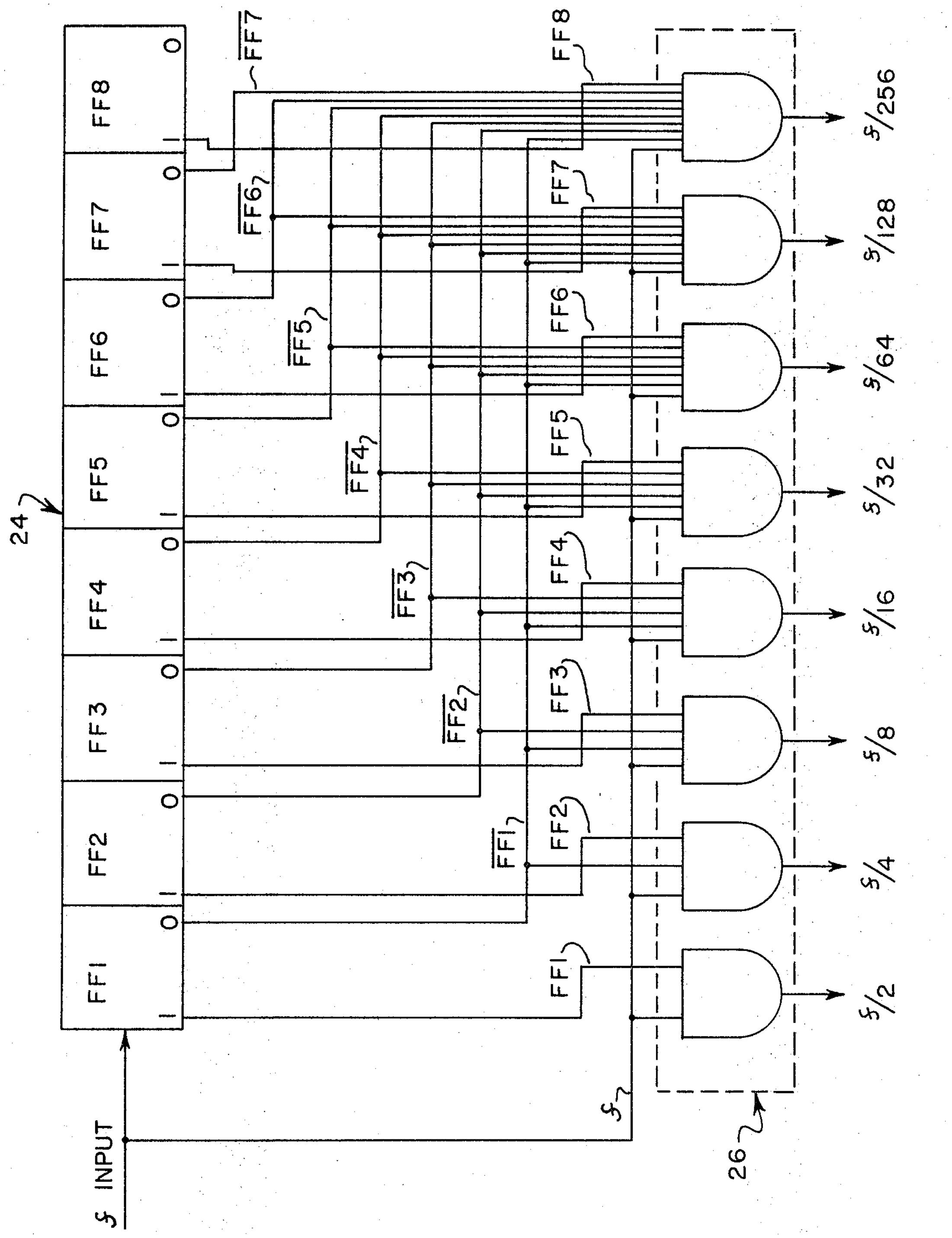
FIG. 6 is a logic diagram of an embodiment of rate generator logic gates useful in the synthesizer of FIG. 4.

The basic application of these equations to logic circuitry is illustrated in "Logical Design of Digital Computers" Montgomery Phister, Jr., John Wiley and Sons, Inc., New York, London, 1958, Library of Congress Catalog Card Number 58–6082. In particular, pages 21–23 of this reference describe and illustrate basic logic circuit implementations, and pages 32–34 illustrate the use of Boolean algebra in relation to these logic circuits, the symbols employed corresponding to the symbols used in the above equations. Accordingly, a preferred embodiment of the logic gates 26 is illustrated in FIG. 6 as comprising a set of eight AND gates, for respectively producing the rates $f/2$ through $f/256$, having input connections to the 1 and 0 outputs of the eight flip-flop stages of divider ripple counter 24 and the $f$ input pulse rate as defined by the above equations.

The rates $f/2$ through $f/128$ are fed in parallel to six rate combiner NOR gates, denoted as block 12, and the $f/256$ pulse train is used to drive the programmer 16. The rate combiner NOR gates selectively combine the rate generator outputs to form composite rates as shown in Table 1:

TABLE 1

| NOR gate number | Input rates | Composite output rate |
|---|---|---|
| 1 | f/128, f/16 | 9f/128 |
| 2 | f/16, f/8 | 24f/128 |
| 3 | f/128, f/64, f/32, f/4 | 39f/128 |
| 4 | f/128, f/64, f/8, f/4 | 51f/128 |
| 5 | f/32, f/16, f/8, f/4 | 60f/128 |
| 6 | f/2 | 64f/128 |

These six composite rate pulse trains are applied to a set of six NAND gates 14 controlled by the programmer 16. The single drive rate selected by the programmer at a given time is applied to a divide-by-four circuit 20, and the resulting smoothed binary waveform is applied to drive an eight-stage UP/DOWN counter 18. The eight output lines of counter 18 are connected to digital to analog converter 22, which consists of an arrangement of clamping diodes and weighted resistors for converting each state of the counter to a corresponding analog voltage. A typical analog to digital conversion network is shown and described on pages 179 and 180 of "Aerospace Telemetry" by Harry Stiltz, Prentice-Hall, Inc., Englewood Cliffs, N.J., 1961, Library of Congress Catalog Card Number 61–15664. As applied to digital to analog converter 22, the stages of counter 18 form the switches shown in FIG. 6.7 on page 179 of this reference.

The programmer 16 has 24 states controlled by a count-of-six, reversible counter 28 in the programmer which counts up and down twice during each sine wave cycle. The drive for the programmer counter 28 is provided by the $f/256$ pulse train produced by rate generator 10 and is applied to the counter through a control gate 30. A decoder logic circuit 32 is coupled to the outputs of reversible counter 28 for controlling: (a) each of the six NAND gates of the rate gate circuit block 14 via control signal lines 34; (b) the pulse drive to the reversible programmer counter 28 via the control signal line 36 connected to gate 30; (c) the direction of reversible programmer counter 28 via control signal line 38; (d) the direction of the 8-stage binary counter 18 via control signal line 40; and, (e) reset of counter 18 via control signal line 42. The purpose of decoder 32 is to identify the state of a sequential device (counter 28), which provides several parallel inputs to the decoder, by generating a signal on one of a number of output lines. To provide this function, decoder logic circuit 32 may comprise a set of AND gates, as described and illustrated on pages 194 and 195 of "Computer Logic" by Ivan Flores, Prentice-Hall, Inc., Englewood Cliffs, N.J., 1960, Library of Congress Catalog Card Number 60–16719. More specifically, a set of six AND gates can be used to provide respective control signal lines 34 to the six NAND gates of the rate gate circuit block 14. The above described control functions (*b*)–(*e*) can then be effectuated by the outputs of the decoder 32 AND gates identifying the 1 and 6 states of counter 28, i.e. the 1 and 6 "Program Counts" of Table 2. More specifically, control signal lines 36 and 38 would be connected to the output of both the 1-count and 6-count AND gates of decoder 32; control signal line 40 would be connected to the output of the 1-count AND gate only; and control line 42 would be connected to the output of only the 6-count AND gate. Thus, when counter 28 goes to the 1 state or to the 6 state, the leading edge of the corresponding decoder output signal will be applied via line 36 to cause gate 30 to block one of the $f/256$ drive pulses and via line 38 to cause counter 28 to reverse the direction of count, such as by toggling a control flip-flop in the counter. In addition, the leading edge of the decoder 1-state output signal will be applied via line 40 to reverse the direction of counter 18, and the leading edge of the decoder 6-state output will be applied via line 42 to reset counter 18.

Figure 5:
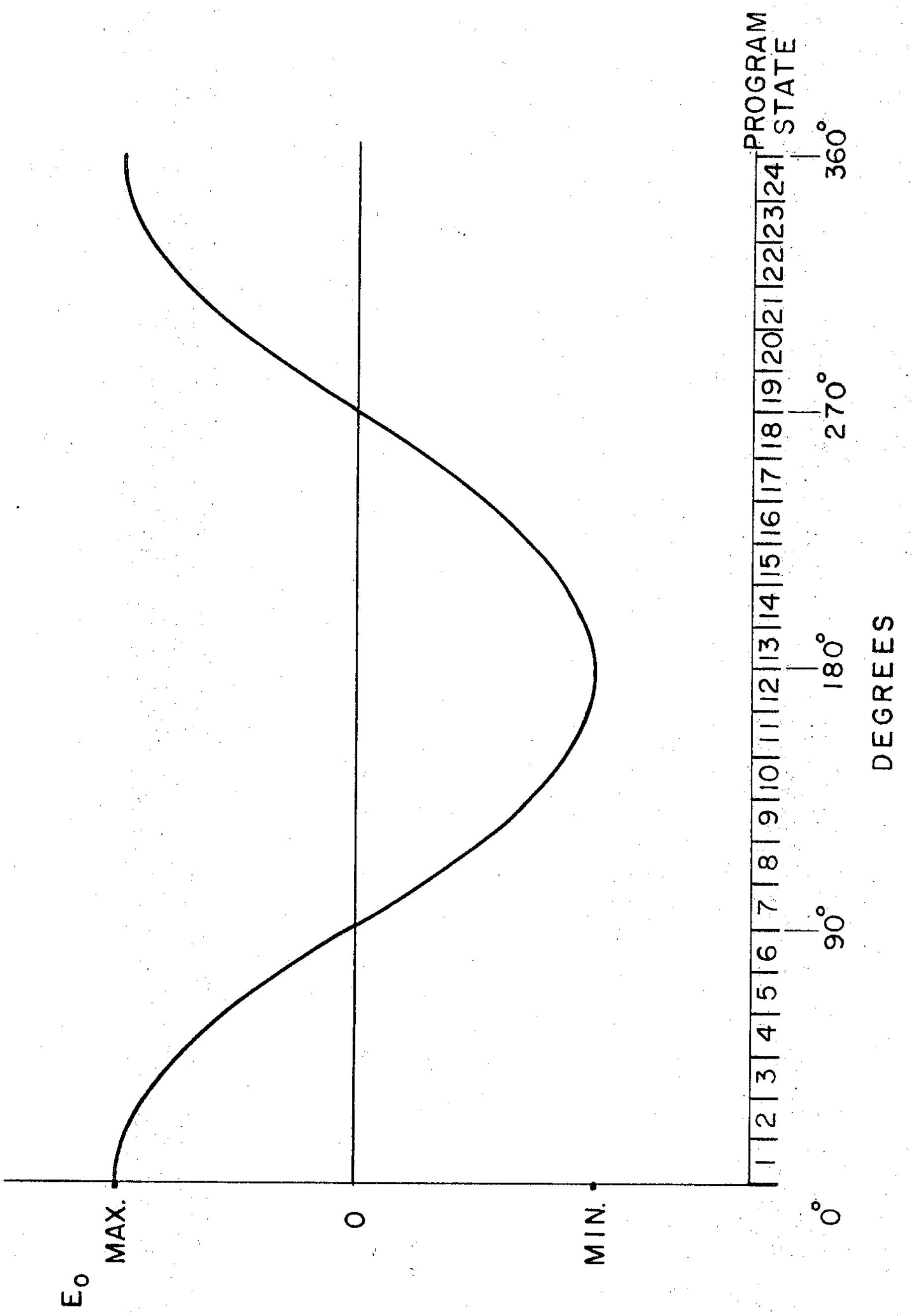
FIG. 5 shows the output waveform of the since wave synthesizer of FIG. 4 with reference to the program states.

One operational cycle of the programmer will now be described with reference to Table 2, which illustrates the sequence of programmer states and their corresponding functions, and the sketch of the synthesizer output waveform shown in FIG. 5. Programmer state 1 starts generation of a cosine wave at 0°. At this start point, the synthesizer binary counter 18 contains its maximum count so that the maximum output voltage level, $E_o$, is generated. A count down signal is generated and applied via line 40 to counter 18, and the program count of 1 allows the slowest rate ($9f/128$) to drive that counter. As a result, a straight line having a slight negative slope is generated during the first program state for the period of 0–15°. The synthesizer reaches 90° and the axis crossing value of $E_o$ by counting up to 6 in the programmer and generating successive negative sloping straight line segments with successively increasing drive rates.

At 90°, a reset pulse is applied via line 42 to counter 18 to assure that it is at the proper count; the programmer counter 28 is reversed to count down by application of a direction control signal via line 38; and, a signal is applied via line 36 to cause gate 30 to block one of the $f/256$ drive pulses so that the count of 6 is held during program state 7. With the programmer counter 28 reversed and the synthesizer counter 18 still counting down, negative sloping straight line segments with successively decreasing drive rates are generated during program states 8 through 12. At the end of state 12, the synthesizer counter 18 contains its minimum count, so that the output voltage, $E_o$, is at its minimum value, and 180° of the cosine wave cycle has been generated.

TABLE 2.—PROGRAMER STATES

| Program state | Program count | Rate | U/D counter 18 direction | Degrees of output cosine wave | Reset |
|---|---|---|---|---|---|
| 1 | 1 | $9f/128$ | D | 0–15 | |
| 2 | 2 | $24f/128$ | D | 15–30 | |
| 3 | 3 | $39f/128$ | D | 30–45 | |
| 4 | 4 | $51f/128$ | D | 45–60 | |
| 5 | 5 | $60f/128$ | D | 60–75 | Counter 18 |
| 6 | 6 | $64f/128$ | D | 75–90 | reset to |
| 7 | 6 | $64f/128$ | D | 90–105 | proper |
| 8 | 5 | $60f/128$ | D | 105–120 | count. |
| 9 | 4 | $51f/128$ | D | 120–135 | |
| 10 | 3 | $39f/128$ | D | 135–150 | |
| 11 | 2 | $24f/128$ | D | 150–165 | |
| 12 | 1 | $9f/128$ | D | 165–180 | |
| 13 | 1 | $9f/128$ | U | 180–195 | |
| 14 | 2 | $24f/128$ | U | 195–210 | |
| 15 | 3 | $39f/128$ | U | 210–225 | |
| 16 | 4 | $51f/128$ | U | 225–240 | |
| 17 | 5 | $60f/128$ | U | 240–255 | |
| 18 | 6 | $64f/128$ | U | 255–270 | Counter 18 |
| 19 | 6 | $64f/128$ | U | 270–285 | reset to |
| 20 | 5 | $60f/128$ | U | 285–300 | proper |
| 21 | 4 | $51f/128$ | U | 300–315 | count. |
| 22 | 3 | $39f/128$ | U | 315–330 | |
| 23 | 2 | $24f/128$ | U | 330–345 | |
| 24 | 1 | $9f/128$ | U | 345–0 | |

At the start of program state 13, both the programmer and synthesizer counters are reversed to count up, and an $f/256$ drive pulse is blocked so that the count of 1 is held during program state 13. Consequently, the synthesizer generates the portion of the cosine wave from 180° to 270° by a series of positive sloping linear segments with successively increasing drive rates. At 270°, another reset pulse is applied to the synthesizer counter 18; the programmer counter 28 is reversed to count down; and, a drive pulse is blocked to keep a program count of 6 during state 19. The period from 270° to 360° is then covered with a sequence of positive sloping linear segments with succesively decreasing drive rates. At the end of state 24, the output voltage, $E_o$, is once again at a maximum level.

Using the positve going axis crossing as the reference point, the function generated by the synthesizer shown in FIG. 4 may be expressed as $$E_o = f(x) = \sin(x/a)$$

where $x$=the total number of input pulses from the given reference point and $a$=the number of pulses per radian. If the synthesizer is driven from a constant rate source, it generates a sine wave which is $1/6144$ times the input pulse rate in frequency (i.e. $f/256/24$). If a variable frequency source such as a voltage controlled oscillator is employed, the sine wave frequency will vary accordingly.

It will be noted that the circuit of FIG. 4 may also be used as a "look-up" table for determining the value of $\sin(x/a)$ for any $x$ number of pulses applied to the input.

In summary, the present invention consists of a digital function synthesizer comprising means for providing a programmed variable pulse rate to a binary counter associated with a digital to analog converter. The digital to analog converter generates a voltage amplitude corresponding to the digital number in the counter which represents a programmed function value, and a sequence of function values is generated in response to the application of a sequence of drive pulses to the binary counter, the slope of the sequence of generated function values corresponding to the rate at which the drive pulses are applied to the counter.

It will be apparent from the foregoing that the present invention is particularly adapted for the generation of low frequency waveforms, especially for applications requiring high reliability, high accuracy and long term stability for lengthy unattended periods. In addition, the digital circuitry avoids the use of frequency sensitive components and reduces power consumption. The described sine wave synthesizer, for example, has been found to be particularly useful in the beam control circuit of an electronically despun antenna system for spin stabilized communication satellites; this antenna system is described in Pat. No. 3,434,142, issued Mar. 18, 1969 and assigned to the assignee of the present application. Further to the above mentioned advantages and applications, the described digital synthesizer is clearly adaptable to a wide range of rate variation, the generated functions being depedent on the number of input pulses applied.

It is to be understood that, although there has been described what are now considered to be preferred embodiments of the invention, modifications falling within the scope and spirit of the invention will occur to those skilled in the art. For example, other digital circuit techniques may be employed for generating the requisite set of pulse trains; other modes of programming may be employed; other forms of logic may be employed for the rate gates; and, it is contemplated that counters relying on other than the binary system may be used. It is intended, therefore, that the invention not be limited to what has been specifically illustrated and described except as such limitations appear in the appended claims.

What is claimed is:

1. A digital function synthesizer comprising, in combination, a digital counter having a pulse drive input and an output from which the digital number contained in said counter can be read, means coupled to the drive input of said counter for providing a programmed variable pulse rate to drive said counter, and a digital to analog converter connected at the output of said counter for generating a voltage amplitude corresponding to the digital number in said counter, said voltage amplitude representing a programmed function value and a sequence of function values being generated in response to the application of a sequence of drive pulses to said counter, the slope of said sequence of generated function values corresponding to the rate at which said drive pulses are applied to said counter.

2. A synthesizer in accordance with claim 1 wherein said means for providing a programmed variable pulse rate to drive said counter comprises, means responsive to applied input pulses for generating a plurality of pulse trains each having a different rate with respect to the others, the rate being defined as the number of pulses generated per given number of applied input pulses, a plurality of controllable gates each having an input to which a respective one of said pulse trains is applied and an output coupled to the drive input of said counter, and a programmer for controlling said gates to select said generated pulse trains one at a time according to a pre-established sequence to drive said counter, and wherein the amplitude of the voltage generated by said converter is the programmed function value corresponding to a given number of input pulses applied to said synthesizer.

3. A synthesizer in accordance with claim 2 wherein said counter is a binary counter adapted to count up or down in response to a direction control signal applied thereto.

4. A synthesizer in accordance with claim 3 wherein said means for generating a plurality of pulse trains comprises a rate generator for producing a plurality of interleaved pulse trains in response to applied input pulses, each of said interleaved pulse trains having a different rate with respect to the others, and a plurality of rate combiners each consisting of a logic gate arranged to collect and combine selected pulse trains produced by said rate generator to form as an output a composite pulse train having a desired rate.

5. A synthesizer in accordance with claim 4 wherein said rate generator comprises a string of binary divider stages connected to form a ripple counter and a logic circuit coupled to the outputs of said divider stages, said logic circuit being operative in response to the application of input pulses to said ripple counter at a constant rate $f$ to generate a plurality of interleaved pulse trains having respective rates of $f/2, f/4, f/8 \ldots f/2^n$, where $n$ is the number of binary divider stages forming said ripple counter.

6. A synthesizer in accordance with claim 4 wherein the input of each gate of said plurality of gates controlled by said programmer is connected to a respective one of said rate combiner outputs and the outputs of said plurality of controllable gates are connected together to provide a single output, and further including a digital smoothing filter coupled between the single output of said plurality of controllable gates and the drive input of said binary counter.

7. A synthesizer in accordance with claim 6 wherein said digital filter is a divider.

8. A synthesizer in accordance with claim 7 wherein said programmer comprises a reversible counter having a pulse drive input to which one of the pulse trains produced by said rate generator is applied and an output from which the digital number contained in said counter can be read, said reversible counter controlling the states of said programmer, and a decoder logic circuit coupled to the output of said reversible counter for controlling (a) each gate of said plurality of controllable gates,
(b) the pulse drive to said reversible programmer counter,
(c) the direction of said reversible programmer counter,
(d) the direction of the binary counter having said digital to analog converter connected at its output, and
(e) reset of the binary counter having the converter connected at its output in a programmed manner in response to a sequence of said programmer states.

References Cited

UNITED STATES PATENTS

| | | | |
|---|---|---|---|
| 3,264,457 | 8/1966 | Seegmiller et al. | 235—150.53 |
| 3,308,279 | 3/1967 | Kelling | 235—151.11 |
| 3,321,608 | 5/1967 | Sterling | 235—151.11 |
| 3,373,273 | 3/1968 | Schubert | 235—197 |

EUGENE G. BOTZ, Primary Examiner

R. W. WEIG, Assistant Examiner

U.S. Cl. X.R.

235—150.5, 197